US009602295B1

(12) United States Patent
Weiner et al.

(10) Patent No.: US 9,602,295 B1
(45) Date of Patent: Mar. 21, 2017

(54) AUDIO CONFERENCING SERVER FOR THE INTERNET

(75) Inventors: Keith Weiner, Queen Creek, AZ (US); Frederick Scott, Phoenix, AZ (US)

(73) Assignee: Avaya Inc., Basking Ridge, NJ (US)

( * ) Notice: Subject to any disclaimer, the term of this patent is extended or adjusted under 35 U.S.C. 154(b) by 1468 days.

(21) Appl. No.: 11/983,616

(22) Filed: Nov. 9, 2007

(51) Int. Cl.
*H04L 12/16* (2006.01)
*H04L 12/18* (2006.01)
*H04M 3/56* (2006.01)
*H04L 29/06* (2006.01)

(52) U.S. Cl.
CPC ...... *H04L 12/1822* (2013.01); *H04L 12/1813* (2013.01); *H04L 65/403* (2013.01); *H04M 3/562* (2013.01); *H04M 3/568* (2013.01)

(58) Field of Classification Search
CPC .. H04M 3/568; H04M 3/567; H04M 2201/41; H04M 3/562; H04M 2201/40; H04M 2242/14; H04M 3/56; H04M 3/564; H04L 65/403; H04L 12/1822; H04L 29/06027; H04L 29/06414; H04L 65/4038; H04L 65/4046; H04N 7/15; H04N 7/152; H04S 2400/11; H04S 7/303; H04S 3/008; G10L 17/00
USPC ............ 370/260, 331, 261; 379/202.01; 348/14.09, 14.08; 700/94
See application file for complete search history.

(56) References Cited

U.S. PATENT DOCUMENTS

| 4,650,929 | A | 3/1987 | Boerger et al. |
| 4,734,934 | A | 3/1988 | Boggs et al. |
| 5,020,098 | A | 5/1991 | Celli |
| 5,113,431 | A | 5/1992 | Horn |
| 5,533,112 | A | 7/1996 | Danneels |
| 5,539,741 | A | 7/1996 | Barraclough et al. |
| 5,790,635 | A | 8/1998 | Dezonno |
| 5,889,843 | A | 3/1999 | Singer et al. |
| 6,011,851 | A | 1/2000 | Connor et al. |
| 6,125,115 | A | 9/2000 | Smits |
| 6,178,237 | B1 | 1/2001 | Horn |
| 6,219,045 | B1 | 4/2001 | Leahy et al. |
| 6,241,612 | B1 | 6/2001 | Heredia |
| 6,327,567 | B1 | 12/2001 | Willehadson et al. |

(Continued)

FOREIGN PATENT DOCUMENTS

| CN | 1703065 A | 11/2005 |
| EP | 0762717 A2 | 3/1997 |

(Continued)

OTHER PUBLICATIONS

Ben Ford, S., et al., "Managing Mutual Awareness in Collaborative Virtual Environments," Proceedings VRST '94 Aug. 1994, ACM Press, Singapore, 14 pages.

(Continued)

*Primary Examiner* — Wei Zhao
*Assistant Examiner* — Lionel Preval
(74) *Attorney, Agent, or Firm* — Sheridan Ross P.C.

(57) ABSTRACT

An audio conferencing server that facilitates free form multi-party conversations between computer users. The audio conferencing server includes gateway elements, mixing elements, and a control element. A method for using the audio conferencing system to facilitate free form multi-party conversations between computer users, particularly in a three-dimensional virtual world using an audio conferencing server.

18 Claims, 12 Drawing Sheets

(56) References Cited

U.S. PATENT DOCUMENTS

| | | |
|---|---|---|
| 6,330,022 B1 | 12/2001 | Seligmann |
| 6,408,327 B1 | 6/2002 | McClennon et al. |
| 6,501,739 B1 | 12/2002 | Cohen |
| 6,539,087 B1 | 3/2003 | Walsh et al. |
| 6,559,863 B1 | 5/2003 | Megiddo |
| 6,657,975 B1 | 12/2003 | Baxley et al. |
| 6,675,054 B1 | 1/2004 | Ruberg |
| 6,807,563 B1 | 10/2004 | Christofferson et al. |
| 6,813,360 B2 | 11/2004 | Gentle |
| 6,839,417 B2 | 1/2005 | Weisman et al. |
| 6,850,496 B1 * | 2/2005 | Knappe et al. ............... 370/260 |
| 6,879,565 B2 | 4/2005 | Baxley et al. |
| 6,959,075 B2 | 10/2005 | Cutaia et al. |
| 6,985,571 B2 | 1/2006 | O'Malley et al. |
| 7,006,616 B1 | 2/2006 | Christofferson et al. |
| 7,111,049 B1 | 9/2006 | Granger et al. |
| 7,180,997 B2 | 2/2007 | Knappe |
| 7,181,690 B1 | 2/2007 | Leahy et al. |
| 7,194,084 B2 | 3/2007 | Shaffer et al. |
| 7,412,392 B1 | 8/2008 | Satapathy |
| 7,418,090 B2 | 8/2008 | Reding et al. |
| 7,456,858 B2 * | 11/2008 | Schrader et al. .......... 348/14.09 |
| 7,466,334 B1 | 12/2008 | Baba |
| 7,908,320 B2 | 3/2011 | Ludwig et al. |
| 7,933,226 B2 | 4/2011 | Woodruff et al. |
| 7,995,732 B2 | 8/2011 | Koch et al. |
| 8,005,023 B2 | 8/2011 | Li et al. |
| 8,059,599 B1 * | 11/2011 | Rogers et al. ................ 370/331 |
| 8,144,633 B2 | 3/2012 | Yoakum et al. |
| 8,315,366 B2 | 11/2012 | Basart et al. |
| 8,351,589 B2 | 1/2013 | Acero et al. |
| 8,363,810 B2 | 1/2013 | Yoakum et al. |
| 8,547,880 B2 | 10/2013 | Yoakum et al. |
| 8,744,065 B2 | 6/2014 | Edholm et al. |
| 2002/0013813 A1 | 1/2002 | Matsuoka |
| 2002/0020951 A1 | 2/2002 | Choi |
| 2002/0181721 A1 | 12/2002 | Sugiyama et al. |
| 2003/0021400 A1 | 1/2003 | Grandgent et al. |
| 2003/0112947 A1 | 6/2003 | Cohen |
| 2003/0117531 A1 | 6/2003 | Rovner et al. |
| 2003/0174657 A1 | 9/2003 | Qin |
| 2003/0234859 A1 | 12/2003 | Malzbender et al. |
| 2004/0047461 A1 | 3/2004 | Weisman et al. |
| 2004/0052218 A1 | 3/2004 | Knappe |
| 2004/0101120 A1 | 5/2004 | O'Malley et al. |
| 2004/0113252 A1 | 6/2004 | Vonstaudt |
| 2004/0190700 A1 | 9/2004 | Cutaia et al. |
| 2004/0240652 A1 | 12/2004 | Kanada |
| 2005/0053214 A1 | 3/2005 | Reding et al. |
| 2005/0062843 A1 * | 3/2005 | Bowers .................. H04N 7/152 348/14.08 |
| 2005/0181872 A1 | 8/2005 | Acharya et al. |
| 2005/0248652 A1 * | 11/2005 | Firestone ............ H04L 12/1822 348/14.09 |
| 2005/0271194 A1 | 12/2005 | Woods et al. |
| 2005/0280701 A1 | 12/2005 | Wardell |
| 2006/0067500 A1 * | 3/2006 | Christofferson ...... H04M 3/568 379/202.01 |
| 2006/0104458 A1 * | 5/2006 | Kenoyer et al. ................ 381/92 |
| 2006/0212147 A1 * | 9/2006 | McGrath ............ H04L 12/1822 700/94 |
| 2007/0071204 A1 | 3/2007 | Kanada |
| 2007/0133436 A1 | 6/2007 | Provino et al. |
| 2007/0263080 A1 * | 11/2007 | Harrell et al. ............. 348/14.08 |
| 2007/0279484 A1 | 12/2007 | Derocher et al. |
| 2008/0037749 A1 | 2/2008 | Metzger et al. |
| 2008/0144794 A1 * | 6/2008 | Gardner .................. 379/202.01 |
| 2008/0144876 A1 | 6/2008 | Reining et al. |
| 2008/0239997 A1 * | 10/2008 | Walker .................... H04L 12/66 370/261 |
| 2008/0260131 A1 | 10/2008 | Akesson |
| 2009/0086949 A1 | 4/2009 | Caspi et al. |
| 2009/0220064 A1 | 9/2009 | Gorti et al. |
| 2010/0020951 A1 | 1/2010 | Basart et al. |
| 2010/0073454 A1 | 3/2010 | Lovhaugen et al. |
| 2010/0158203 A1 | 6/2010 | Mikan et al. |
| 2011/0077755 A1 | 3/2011 | Yoakum et al. |

FOREIGN PATENT DOCUMENTS

| | | |
|---|---|---|
| EP | 1954019 A1 | 8/2008 |
| GB | 2303516 A | 2/1997 |
| WO | 9941880 A1 | 8/1999 |
| WO | 0048379 A1 | 8/2000 |
| WO | 2004095822 A1 | 11/2004 |
| WO | 2010046736 A1 | 4/2010 |
| WO | 2011036543 A1 | 3/2011 |

OTHER PUBLICATIONS

Damer, B., "Avatars!: Exploring and Building Virtual Worlds on the Internet (excerpts)", Peachpit Press, Berkeley, 1998, 158 pages.

No Author, "Digital Space Traveler User Guide," The Digital Space Commons, Chapters 1-8, http://www.digitalspace.com/traveler/DigitalSpaceTravelerUserGuide.pdf, 46 pages.

McCarthy, S., "PC users step through their screens via OnLive!," Telephony Online, Sep. 9, 1996, accessed May 27, 2007, http://telephonyonline.com/mag/telecom_pc_users_step/, 2 pages.

No Author, "OnLive! Products," OnLive! Technologies, Inc., accessed May 22, 2007, http://web.archive.org/web/19970714193742/http://www.onlive.com/prod/, 3 pages.

Liesenborgs, J., "Voice over IP in networked virtual environments," Maastricht University Doctoral Thesis, 1999-2000 Academic Year, Title Page, Table of Contents and Chapters 6 and 10, 18 pages.

Eubank, W., "Summer Internet World '97 McCormick Place, Chicago, Illinois, Jul. 21-25, 1997", Aug. 1, 1996, updated Aug. 1, 1997, http://www.eubank-web.com/William/Articles/world97.htm, 5 pages.

No Author, "3D Conferencing White Paper," DiamondWare, May 19, 2005, 7 pages.

No Author, "3D Audio through the Internet," DiamondWare, May 15, 2005, 7 pages.

No Author, "Out With the Old, in With Palantir," DiamondWare, Sep. 28, 2003, 2 pages.

Final Office Action for U.S. Appl. No. 12/948,140 mailed May 7, 2013, 18 pages.

Advisory Action for U.S. Appl. No. 12/948,140 mailed Jul. 11, 2013, 3 pages.

Notice of Allowance for U.S. Appl. No. 12/569,931 mailed May 28, 2013, 7 pages.

Final Office Action for U.S. Appl. No. 11/233,773 mailed Jun. 27, 2012, 49 pages.

Non-final Office Action for U.S. Appl. No. 12/569,931 mailed Aug. 3, 2012, 16 pages.

Notice of Allowance for U.S. Appl. No. 12/555,413 mailed Aug. 17, 2012, 9 pages.

Non-final Office Action for U.S. Appl. No. 12/887,734 mailed Sep. 4, 2012, 15 pages.

Non-final Office Action for U.S. Appl. No. 12/948,140 mailed Oct. 24, 2012, 18 pages.

Search Report for United Kingdom Patent Application No. 1119805.8 issued Mar. 14, 2012, 2 pages.

Final Office Action for U.S. Appl. No. 12/569,931 mailed Dec. 19, 2012, 16 pages.

Final Office Action for U.S. Appl. No. 12/887,734 mailed Jan. 3, 2013, 16 pages.

Office Action for Chinese Patent Application No. 201080030095.1, mailed Dec. 23, 2013, 15 pages (English Translation).

Office Action for Chinese Patent Application No. 201080030095.1, mailed Dec. 23, 2013, 11 pages.

Notice of Allowance for U.S. Appl. No. 12/887,734, mailed Jan. 16, 2014, 17 pages.

Examiner's Answer for U.S. Appl. No. 12/948,140, mailed Jan. 16, 2014, 6 pages.

Second Office Action for Chinese Patent Application No. 201080030095.1, mailed Sep. 10, 2014, 9 pages.

(56) References Cited

OTHER PUBLICATIONS

First Office Action for Chinese Patent Application No. 201110374954.5, mailed Feb. 28, 2015, 17 pages.
Second Office Action for Chinese Patent Application No. 201110374954.5, mailed Oct. 20, 2015, 16 pages.

* cited by examiner

First Version: "Centralized" Audio Conferencing Server Architecture

Second Version: "Central/Off-Loaded" Audio Conferencing Server Architecture

Third Version: "Chained" Audio Conferencing Server Architecture

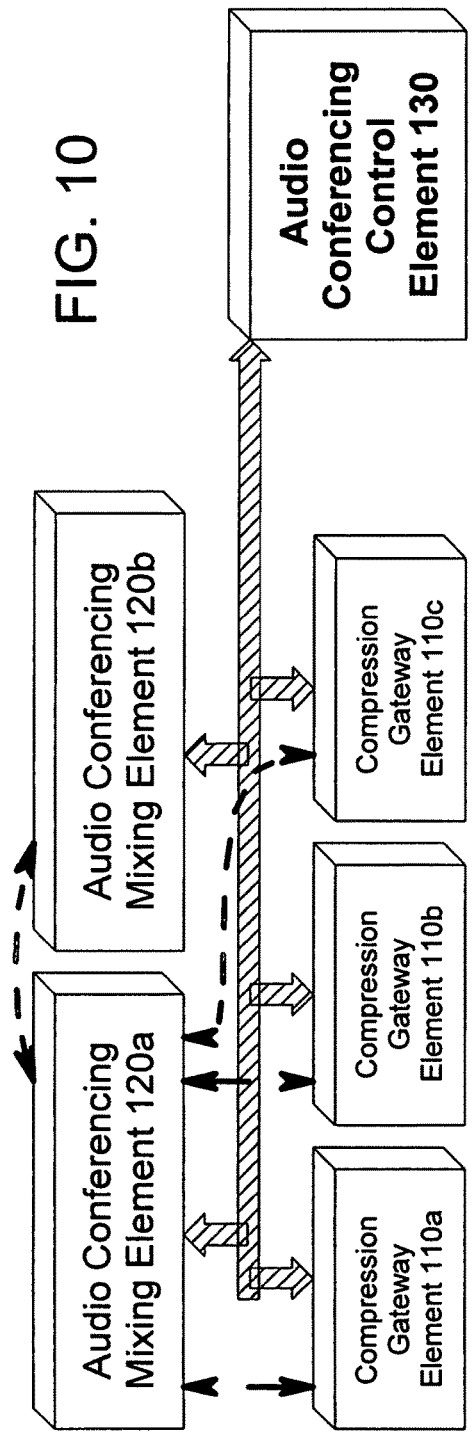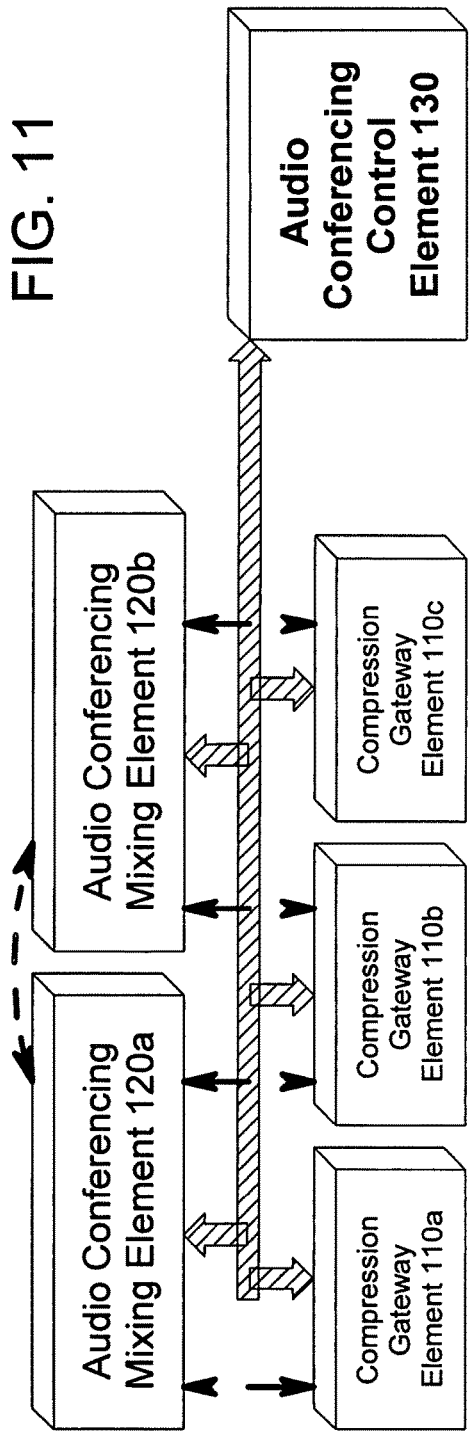

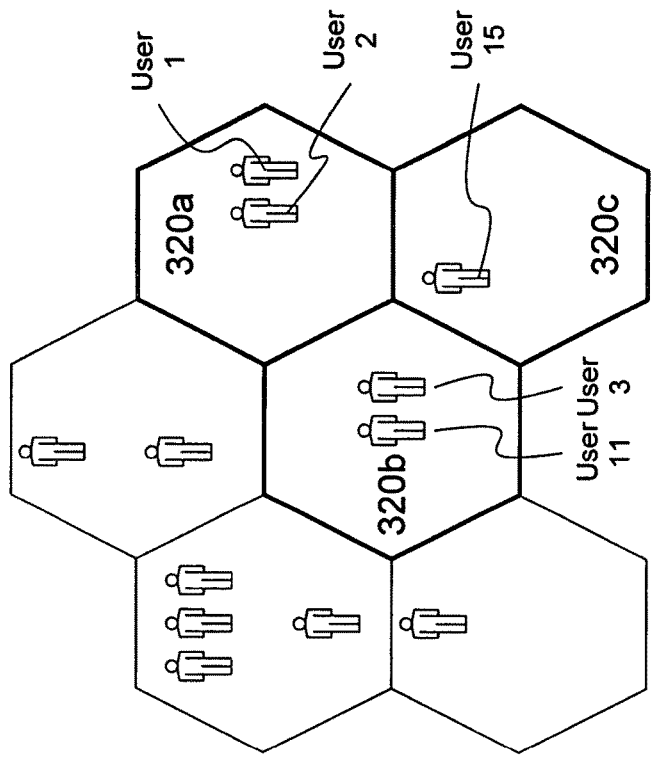
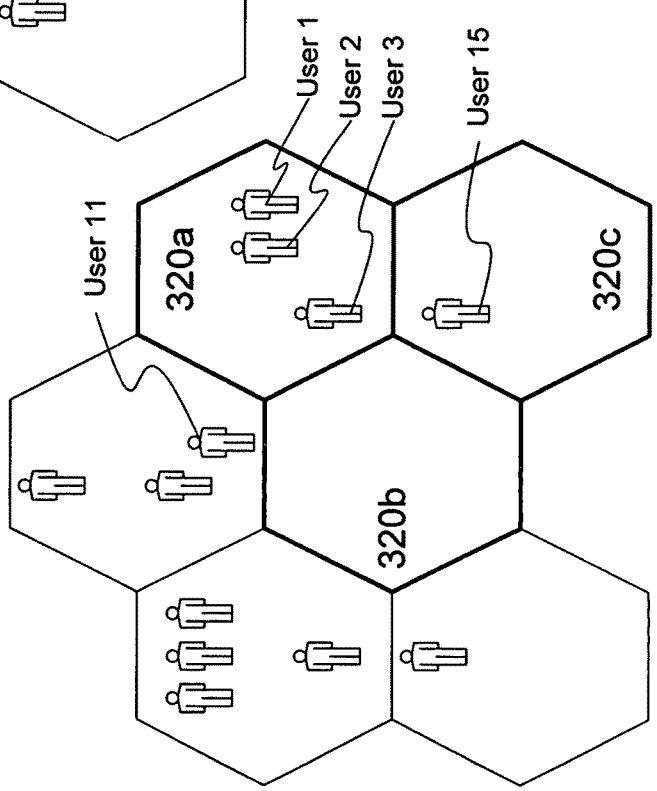
FIG. 14
FIG. 13

AUDIO CONFERENCING SERVER FOR THE INTERNET

COPYRIGHT NOTICE

A portion of the disclosure of this patent document contains material that is subject to copyright protection. The copyright owner has no objection to the facsimile reproduction of the patent disclosure, as it appears in the Patent and Trademark Office patent files or records, but otherwise reserves all copyright rights whatsoever.

REFERENCE TO A COMPUTER PROGRAM

A computer program listing Appendix A is submitted on a compact disc and the material (including AppendixA.txt that contains the following software components: tesselation.c, control_transmit_assignments_CGWs.c, CGWs_receive_assignments_control.c, CGWs_exchange_audio_with_mixers.c, Mixers_exchange_audio_with_CGWs.c, Mixers_send_audio_to_mixers.c, Mixers_receive_audio_from_Mixers.c, control_transmit_assignments_mixers.c, Mixers_receive_assignments_control.c) on the compact disc is herein incorporated by reference.

The single compact disc (submitted in duplicate) includes a single file (AppendixA.txt, Nov. 9, 2007, 116 KB) with portions of an exemplary computer code implementing one preferred embodiment of the present invention.

BACKGROUND OF INVENTION

The present invention is directed to an audio conferencing server and, more specifically to an audio conferencing server for the internet.

An internet audio conferencing server allows computer users at remote locations to speak to and hear groups of other computer users and to carry on free form multi-party conversations in real time.

The term "computer user" is generally meant to be at least one person, but may have other meanings, such as at least one automated program, at least one device acting on the person's behalf, or any combination of the above (e.g. two or more people, at least one automated program, and/or at least one device). For example, when it is stated that the computer user provides an audio stream, the human computer user may be providing audio that the automated program and/or the device is "translating" (e.g. converting) into an audio stream suitable for transmission. Another example is that for some matters (e.g. technical matters), an automated program and/or a device (e.g. a computer or other processing device) could act on behalf of the human computer user with or without prior instructions from the human computer user.

"Audio conferencing" has a slightly different meaning than "free form multi-party conversations." "Audio conferencing" is meant to include any type of multi-party audio conferencing. "Free form multi-party conversations" are more dynamic than audio conferencing. An example of free form multi-party conversations might be found in a 3D virtual world where computer users represented by graphical representations (e.g. avatars) move around and hear ambient sounds, have conversations with other computer users, and otherwise have a dynamic audio experience. The free form multi-party conversation may occur in an audio conference.

Exemplary free form multi-party conversations and audio conferencing are described in U.S. patent Ser. No. 11/233,773 (the '773 reference), which is assigned to the assignee of the present application, the disclosure of which is incorporated herein by reference. The '773 reference describes an advanced voice server to which a plurality of clients (computer users) may connect. The advanced voice server is able to perform processing functions with real-time-updated processing parameters uniquely for each client voice (audio input to an audio input device), for each client. Each client has a unique mix-list of the processing functions and their respective processing parameters that the advanced voice server uses to uniquely mix a unique voice mix for each client to be heard on an audio output device. The processing parameters may be supplied by the client, by a system administrator, or by an automated process acting on behalf of the client. In addition, exemplary audio conferences and/or free form multi-party conversations are described in U.S. Pat. No. 6,125,115 to Smits, U.S. Pat. No. 4,650,929 to Boerger et al., U.S. Pat. No. 5,539,741 to Barraclough et al., U.S. Pat. No. 5,113,431 to Horn, the disclosures of which are incorporated herein by reference.

Audio conferencing server architecture is the system over which audio conferencing and/or free form multi-party conversations are implemented. There are three primary known prior art versions of audio conferencing server architectures: a "centralized server" audio conferencing server architecture (FIG. 1), a "central/off-loaded" audio conferencing server architecture (FIG. 2), and a "chained" audio conferencing server architecture (FIGS. 3 and 4).

FIG. 1 is directed to a first version of existing audio conferencing server architecture and, more specifically to a "centralized" audio conferencing server architecture system (also referred to herein as the "centralized server system"). The centralized server system has a one-stage audio stream between a centralized server and computer users (shown as Users 1-10). The centralized server system is the most basic version of an existing audio conferencing server that allows computer users to form connections between their local computers and a centralized server and thereby to define free form multi-party conversations. The centralized server receives a real time input audio stream from each computer user, mixes an output audio stream for each computer user, and sends each of the audio streams to the respective computer user(s). The generated audio stream that is the "output" may simply contain a generic mix of all the other computer users' input audio streams or the generated audio stream may be modified in various ways, such as by varying the gain (volume) of the various audio stream inputs and/or applying various audio effects to the various audio stream inputs to clarify the input and/or allow the listener to distinguish between input sources.

This centralized server system offers the advantage of simplicity of implementation. One limitation of such a centralized server system, however, is a capacity limitation in that a centralized server lacks the ability to scale beyond a certain number of computer users. This capacity and/or inability to scale limitation can be a problem if an arbitrary level of usage by a given population of computer users is desired that is too great for any existing centralized server hardware to support. Supporting the same computer user population on multiple servers in order to circumvent the capacity limitation is unsatisfactory. One reason that multiple servers are unsatisfactory for this centralized server system is because multiple servers require a multiplication of administrative effort. Another reason that multiple servers are unsatisfactory for this centralized server system is because computer users have to perform extra work (or steps) to determine which server they can use that has available capacity at any given time. Yet another reason that multiple servers are unsatisfactory for this centralized server system is because multiple servers require a means for allowing computer users to agree on which server to form their free form multi-party conversation at the moment they form the free form multi-party conversation. Still another reason why multiple servers are unsatisfactory is because this approach divides a large 3D virtual world into discontiguous audio spaces.

FIG. 2 is directed to a second version of existing audio conferencing server architecture and, more specifically to a "central/off-loaded" audio conferencing server architecture system (also referred to herein as the "central/off-loaded server system"). The central/off-loaded server system has a two-stage audio stream between a central server, compression gateways, and computer users (shown as Users 1-12). The central/off-loaded server system uses a central server that is connected to at least one compression gateway. The compression gateways provide some of the functions (e.g. compression, decompression, and jitter buffering) normally performed by the central server. This off-loading leaves the central server with more computational capacity available to service audio mixing. To define free form multi-party conversations, computer users form connections between their local computers and a compression gateway that, in turn, connects to the central server. Compressed audio streams are received from the internet and decompressed by compression gateways. Compression gateways are also responsible for compressing and sending the mixed output audio streams back out to the internet at the end of the mixing process. Furthermore, compression gateways are also responsible for repairing the temporal state of the audio input data if the temporal state gets damaged between the computer user's computer and the compression gateway. Correcting the temporal state is accomplished through use of a "jitter buffer" feature that trades latency for smoothness in audio streams' arrival rates by buffering arriving audio streams and metering the buffered audio streams out to the mixing function smoothly.

Whereas the centralized server system of the audio conferencing server architecture performs functions (e.g. compression, decompression, and jitter buffering) on the centralized server, the central/off-loaded server system version of the audio conferencing server architecture off-loads the performance of these functions to other server computers (i.e. the compression gateways) and the raw audio streams are transmitted over a reliable internal server site network (e.g. LAN) to the central server for mixing. Ultimately, however, the central/off-loaded server system still has the same limitations as the centralized server system: its capacity is still limited by the computer-intensive task of mixing audio streams. Even a central server aided by many compression gateways can only support a finite number of computer users.

FIG. 3 is directed to a third version of existing audio conferencing server architecture and, more specifically to a "chained" audio conferencing server architecture system (referred to herein as the "chained server system"). This chained server system has a two-stage audio stream between any of the chained servers, another chained server, and computer users (shown as Users 1-12) where the audio stream is mixed two times. Using this chained server system, computer users connect to any of the plurality of chained servers that are in a communicative relationship with each other. This chained server system attempts to solve the problems associated with the capacity limitations of the first two versions by utilizing multiple servers that are chained (e.g. networked) together. Computer users form connections to any chained server that has available capacity. The chained servers then pass audio streams between one another to bridge distributed conferences on high-speed networks located at the server site. In order to reduce the network bandwidth required between chained servers, the inputs from computer users in a free form multi-party conversation that are collocated on the same chained server are pre-mixed on that chained server. Then, the pre-mixed outputs are passed to at least some of the other chained servers with the audio from computer users in the same conference in mixed form (the pre-mixed output). This pre-mixed output is then mixed as necessary with the pre-mixed output from other chained servers and with any mixed output from computer users located on the final mixing server. The final mixed output is then transmitted to at least one computer user in the free form multi-party conversation that is directly connected to that chained server. An exemplary flow of a free form multi-party conversation using this chained server architecture is shown in FIG. 4 and discussed below. The pre-mixing is an essential feature of this chained server system since without the pre-mixing, the amount of bandwidth between the various chained servers would be equal to the bandwidth taken up by all computer users, which would then become a hard limitation to the number of computer users that could be supported in the architecture—the limitation that the chained server system is attempting to avoid. The pre-mixing also saves considerable CPU cycles on the server(s) receiving the pre-mix.

FIG. 4 is a simplified block diagram of an example of a free form multi-party conversation flow using the "chained" audio conferencing server architecture of FIG. 3. In this example, computer users 1-4 are connected to chained server A, computer users 5-8 are connected to chained server B, and computer users 9-12 are connected to chained server C. In this example, chained servers A and B mix the audio from their respective computer users and then pass the pre-mixed audio stream data to chained server C, thereby bridging the conference. At chained server C, the pre-mixed outputs from chained servers A and B are mixed with the audio from computer users 9-11 (shown as being sent individually, but alternatively being a pre-mixture) to form a final mixed output that is transmitted to computer user 12.

The chained server system solves the problem addressed above (in connection with a multiple server embodiment of a centralized server) concerning computer users being required to agree on a chained server at the moment they form their free form multi-party conversation by allowing free form multi-party conversations to be formed across chained server boundaries. The chained server system also does a reasonable job of increasing server capacity where pre-mixing can be leveraged to save network bandwidth and CPU cycles.

Another limitation of the chained server system is that it becomes impossible (or at least impossible to guarantee) that individual users can receive (or control) volume and/or effects for any given input audio stream when mixed to any given output audio stream because once multiple input audio streams are pre-mixed, they cannot be separated and mixed at the destination server. Thus, a selected gain level or effect applied to a given input audio stream in pre-mix must be received by all computer users who will get the same pre-mix in their output audio stream. Applying a gain level or effect on a pre-mix at the destination server would solve the problem of allowing each individual's output audio stream to vary according to his wishes, but this scheme would require that the same gain level or effect be applied to all of the input audio streams in a pre-mix received by the destination server. One way or another, there becomes no way to guarantee individual gains and effects can be applied to individual input audio streams for any individual output audio stream as long as the technique of pre-mixing is used. But the capacity limitations of the servers and intervening network bandwidth would become exhausted far too quickly to make the structure worthwhile to pursue without pre-mixing.

Pre-mixing restricts the ability to provide free form multi-party conversations because pre-mixing forces users to hear the pre-mixed audio stream substantially as it is pre-mixed (although there might be a variation of overall volume). Accordingly, the resulting audio stream is not "free form."

BRIEF SUMMARY OF THE INVENTION

The present invention is directed to an audio conferencing server and, more specifically to an audio conferencing server for the internet.

The objective of an internet audio conferencing server is to allow computer users at remote locations to speak to and hear groups of other computer users and to carry on free form multi-party conversations in real time.

An audio conferencing server of the present invention facilitates free form multi-party conversations between computer users. The audio conferencing server includes gateway elements, mixing elements, and a control element. Each of the gateway elements is in communication with at least a subset of the mixing elements. Each of the gateway elements is in communication with at least a subset of the computer users. Each of the mixing elements is in communication with at least a subset of the remainder of the mixing elements. The control element is in communication with the gateway elements, the mixing elements, and the computer users.

At least one source computer user provides a source audio stream to a gateway element. One of the mixing elements receives the source audio stream from the gateway element. One of the mixing elements performs a mixing function on the source audio stream to form an audio stream mix using the source audio stream. At least one destination computer user receives the audio stream mix from the mixing element performing the mixing function on the source audio stream. A computer user using the audio conferencing server can identify other individual computer users and adjust sound settings applied to the other individual computer users.

One preferred embodiment of the present invention is a method for facilitating free form multi-party conversations between computer users using an audio conferencing server. Another preferred embodiment of the present invention is a method for facilitating free form multi-party conversations between computer users in a three-dimensional virtual world using an audio conferencing server.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 10 is a simplified block diagram of exemplary connections between the gateway elements and mixing elements prior to a mixing control change, where the lines between the gateway elements and mixing elements represent the audio streams for respective users.

FIG. 11 is a simplified block diagram of exemplary connections between the gateway elements and mixing elements after a mixing control change, where the lines between the gateway elements and mixing elements represent the audio streams for respective users.

FIG. 13 is a graphical representation of an exemplary tesselled or tiled virtual world showing the position of avatars within the virtual world prior to two exemplary mixing control changes.

FIG. 14 is a graphical representation of an exemplary tesselled or tiled virtual world showing the position of avatars within the virtual world after two exemplary mixing control changes.

DETAILED DESCRIPTION OF THE INVENTION

One preferred embodiment of the audio conferencing server 100 of the present invention is based on the philosophy that all mixing of audio stream input sources (e.g. voices or other sounds output from source computer users) for a given audio stream output mix (e.g. a mix of audio streams from source computer users received by destination computer users) should take place on a single server. This is required to avoid the "chained" audio conferencing server architecture system's limitations such as the inability to apply individual gains and/or effects to any individual audio stream input for any individual audio stream output. It is important to remove the limitations of the "chained" audio conferencing server architecture system (and other prior art systems) in order to allow computer users to identify individual speakers and to permit computer users to adjust sound settings (e.g. gain (volume) and/or audio effects (voice processing effects)) applied to other computer users to individual taste (e.g. as discussed in the '773 reference). The ability for computer users to identify individual computer users (e.g. speakers or other sources of audio) and to adjust sound settings applied to other computer users is also critical to the simulation of geographical position utilizing 3D sound effects (e.g. in a three-dimensional virtual world) and particularly to free form multi-party conversations.

Figure 1:
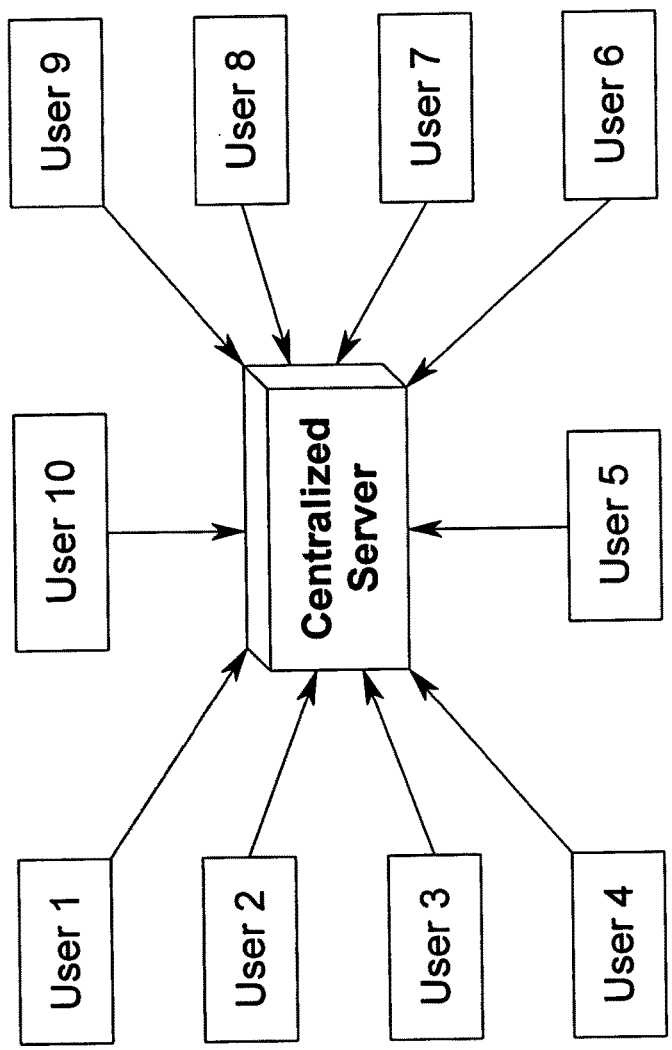
FIG. 1 is a simplified block diagram of an existing centralized audio conferencing server architecture in which computer users form connections between their local computers and a centralized server and thereby define free form multi-party conversations.
Figure 2:
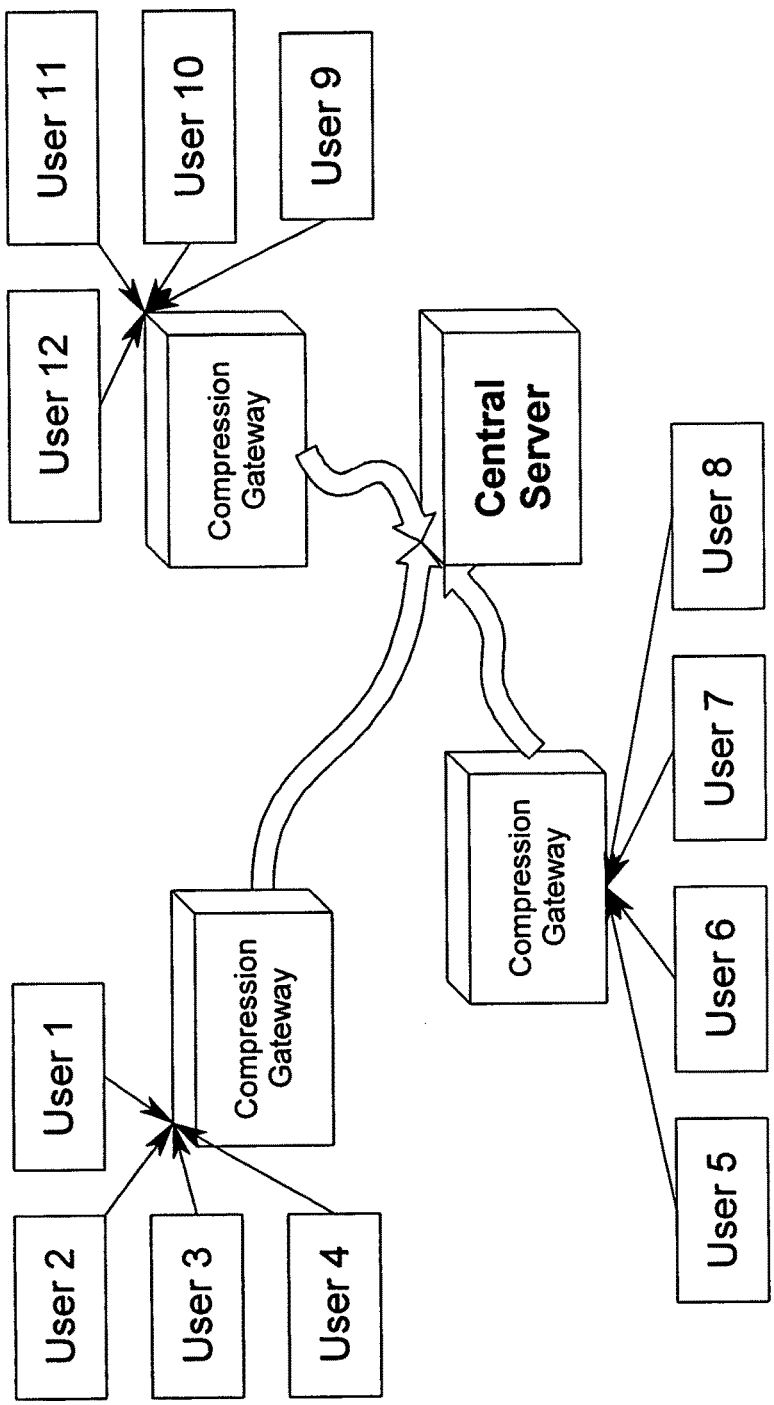
FIG. 2 is a simplified block diagram of an existing central/off-loaded audio conferencing server architecture system in which computer users form connections between their local computers and a compression gateway that, in turn, connects to the central server.
Figure 3:
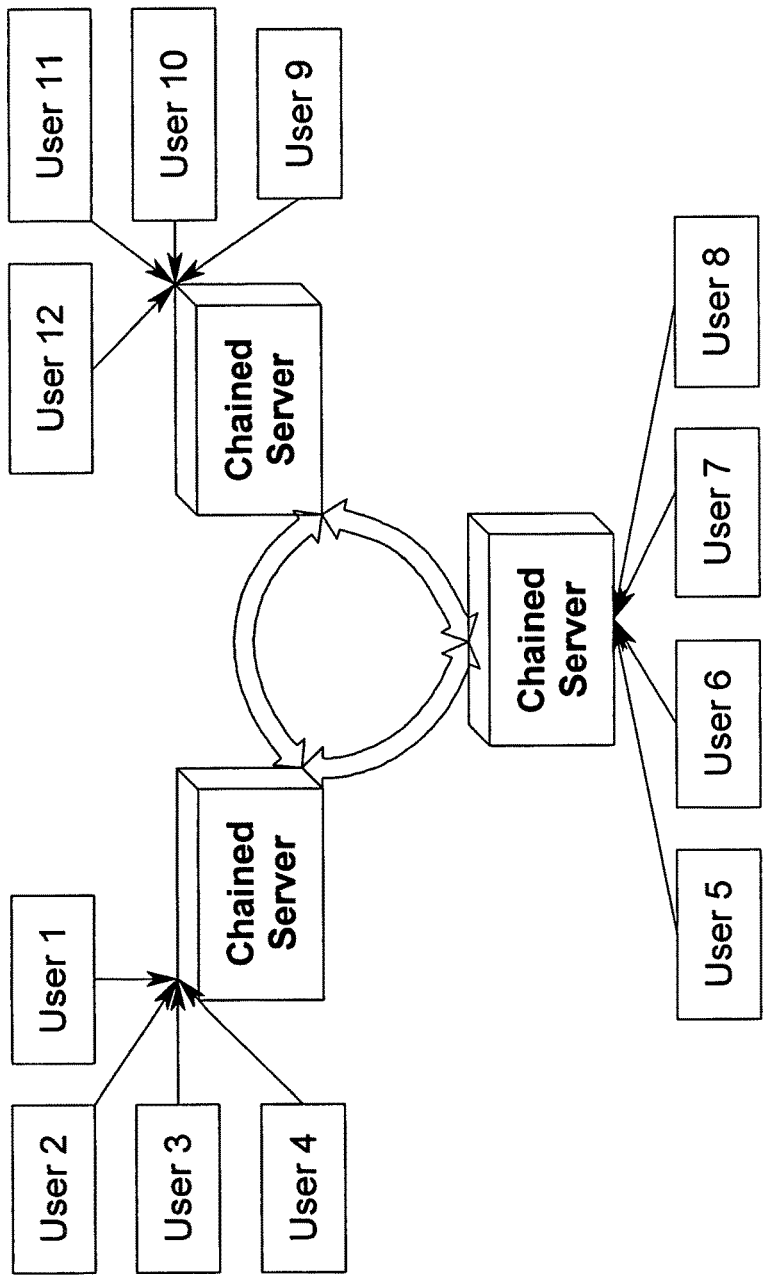
FIG. 3 is a simplified block diagram of an existing "chained" audio conferencing server architecture in which computer users connect to any of a plurality of chained servers that have a communicative relationship.
Figure 4:
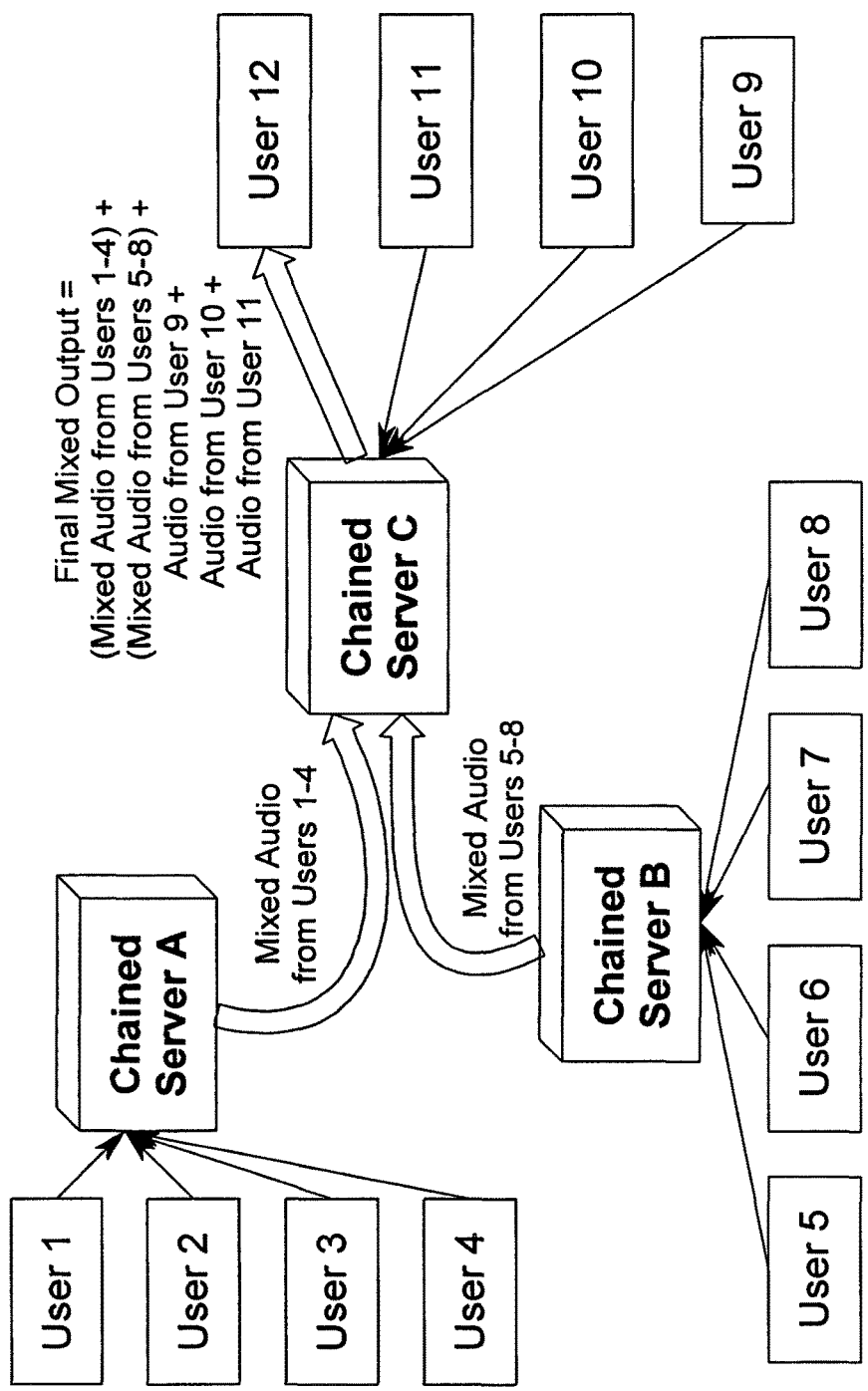
FIG. 4 is a simplified block diagram of an example of a free form multi-party conversation flow using the "chained" audio conferencing server architecture of FIG. 3.
Figure 5:
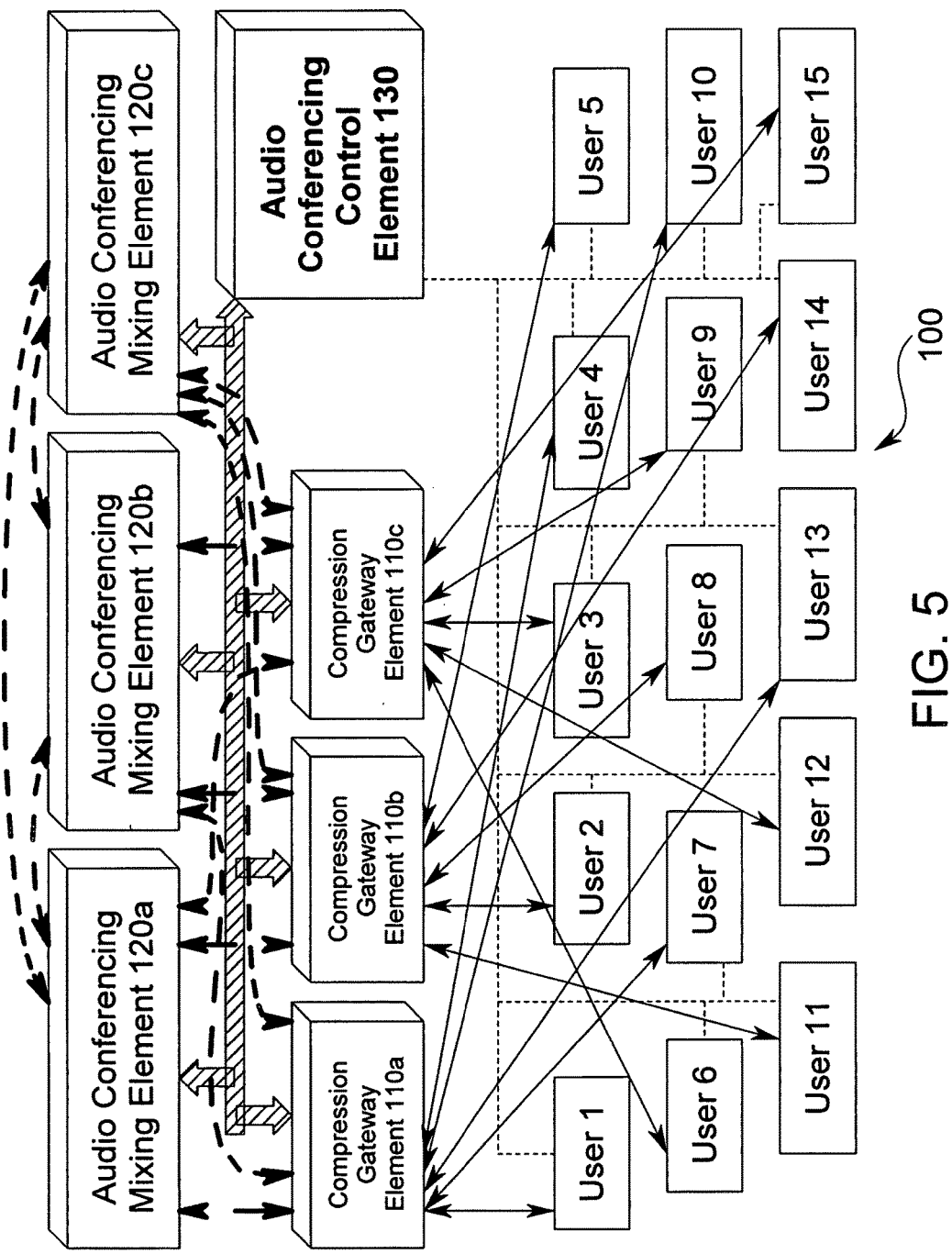
FIG. 5 is a simplified block diagram of a preferred exemplary embodiment of a multistage audio conferencing server architecture system of the present invention including gateway elements, mixing elements, and a control element.

FIG. 5 shows an overview of one preferred embodiment of the multistage audio conferencing server architecture system (also referred to as the "multistage server system 100") of the present invention that allows computer users (Users 1-15) at remote locations to speak to and hear groups of other computer users (Users 1-15) and to carry on free form multi-party conversations in real time. The exemplary connections that are shown as overlapping in FIG. 5 are divided into control connections (FIG. 6) and audio connections (FIG. 7). The shown multistage server system 100 includes gateway elements 110 (shown as compression gateway elements 110a-c), mixing elements 120 (shown as audio conferencing mixing elements 120a-c), and a control element 130 (shown as audio conferencing control element 130 and also referred to as a "controller"). The use of gateway elements 110, mixing elements 120, and a control element 130 allows extensibility without the problem associated with limited server processing power for mixing and/or the problem of the inability to apply separate gains and effects on a single audio stream input source to a single audio stream output mix.

Each element preferably performs a specific function or group of functions. For example, the control element 130 performs control functions such as synchronizing changes in control settings and dynamic audio paths to take place simultaneously at gateway elements 110 and mixing elements 120. The control element 130 also handles general control functions including, but not limited to: computer user logins; audio conference creation, administration, and deletion; volume control (which is forwarded to the mixing elements 120); sound effect controls (which is forwarded to the mixing elements 120); and so forth. Control functions are managed using the control element 130 that has separate network paths directly to and from computer users and to and from the other elements. The gateway elements 110 preferably perform gateway functions such as compression, decompression, jitter buffering, packet loss concealment, and clock drift correction. The mixing elements 120 preferably perform the mixing functions and 3D and other sound effects. The mixing functions may be generally understood as combining a plurality of audio streams including, preferably, adjusting sound settings for each input audio stream for each output audio stream mix based on, for example, a computer user's mix-list and/or position in a 3D world. Examples of mixing functions are described in the '773 reference. It should be noted that in alternative preferred embodiments, some of the elements may perform alternative and/or additional functions. For example, in addition to mixing, the mixing elements 120 could perform jitter buffering. In preferred embodiments of the present invention, mixing functions are handled separately from control functions so that the control functions have a minimal impact on the mixing functions.

Figure 6:
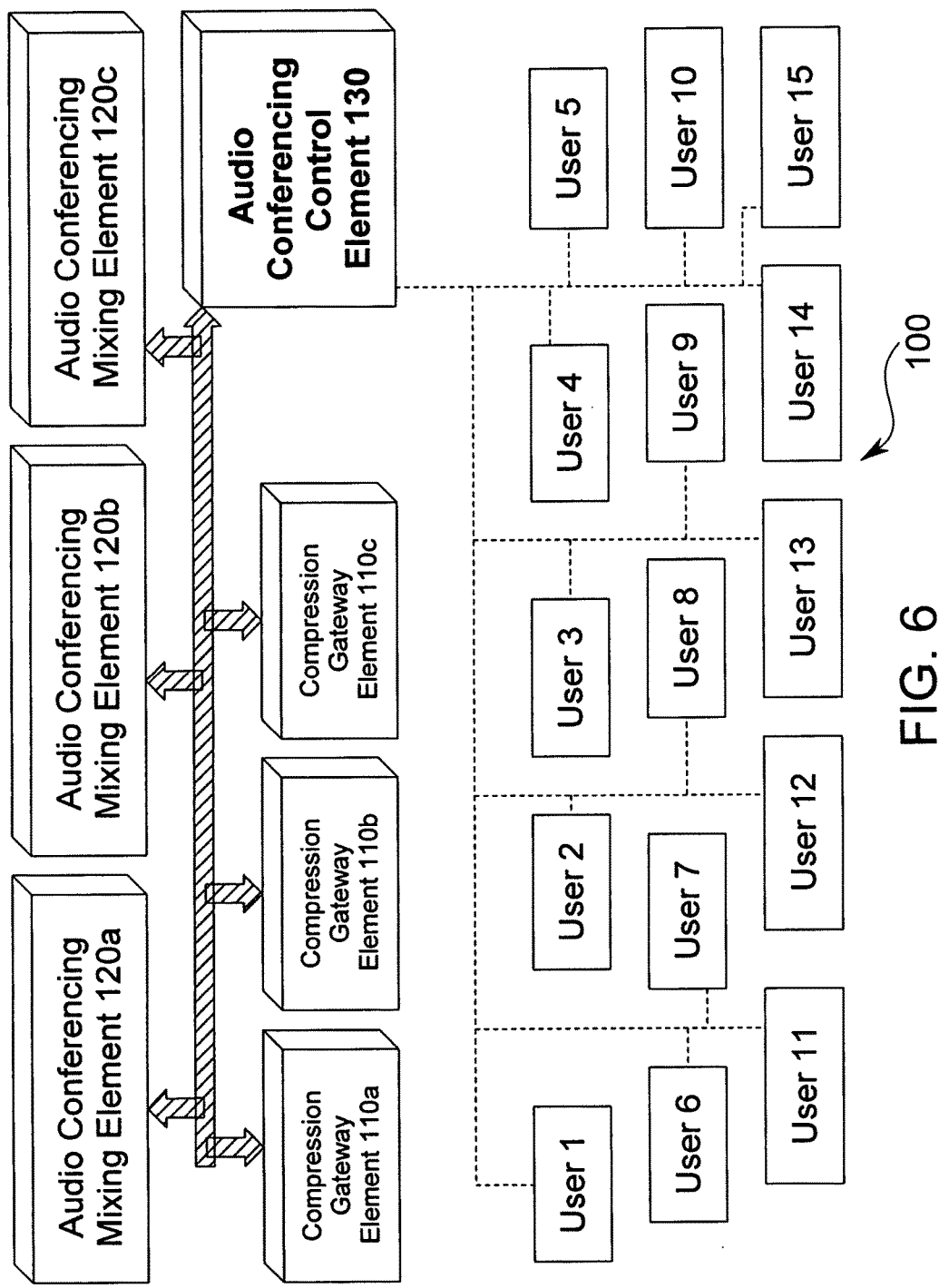
FIG. 6 is a simplified block diagram of a preferred exemplary embodiment of a multistage audio conferencing server architecture system of the present invention that specifically shows the control connections between the control element and the gateway elements, the control connections between the control element and the mixing elements, and the control connections between the control element and the users.
Figure 7:
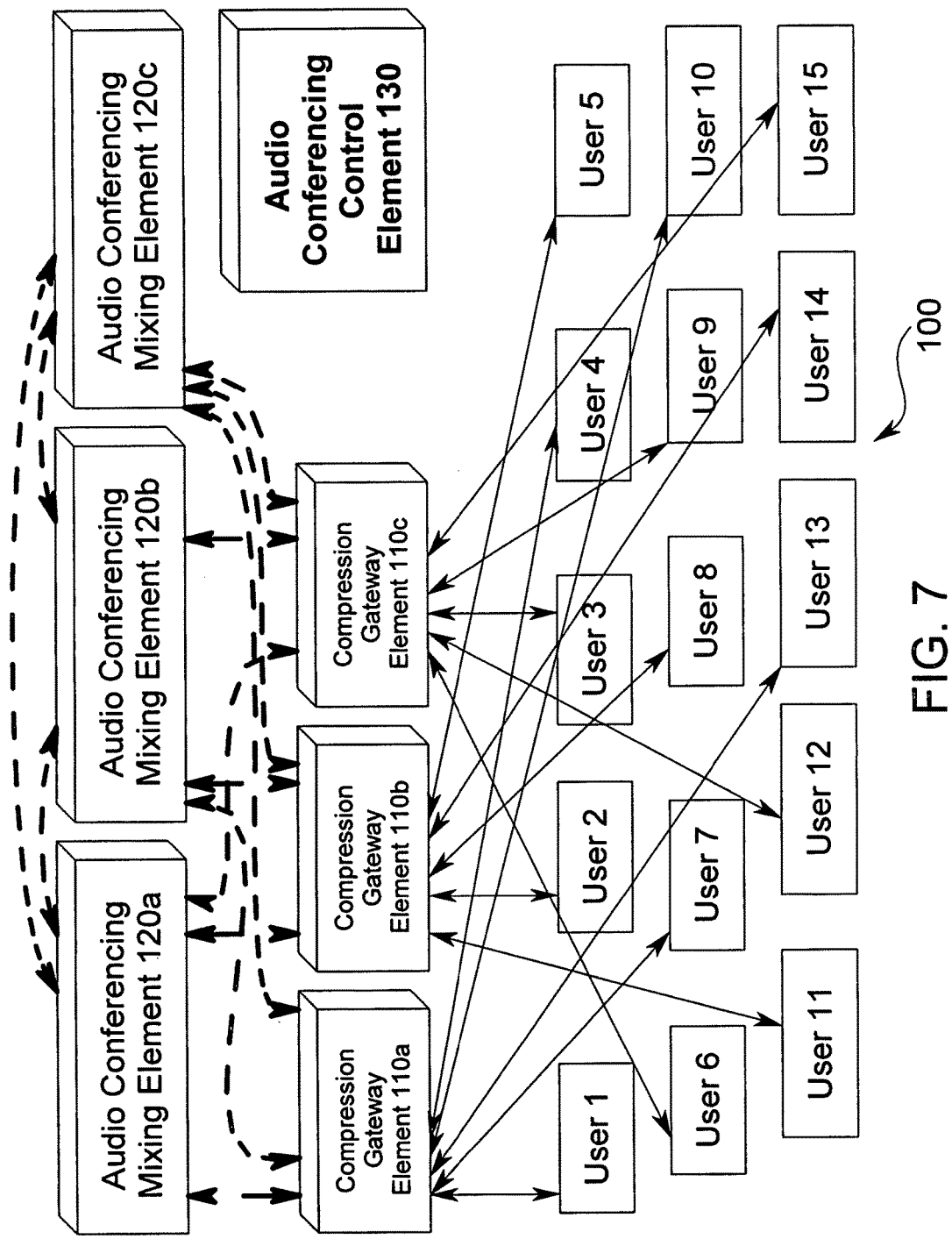
FIG. 7 is a simplified block diagram of a preferred exemplary embodiment of a multistage audio conferencing server architecture system of the present invention that specifically shows the audio connections between the gateway elements and the users, the audio connections between the gateway elements and the mixing elements, and the audio connections between the mixing elements themselves.

FIGS. 5, 6, and 7 also show a preferred embodiment of the connections between the computer users (Users 1-15), the gateway elements 110, the mixing elements 120, and the control element 130. As set forth above, the exemplary connections that are shown as overlapping in FIG. 5 are divided into control connections (FIG. 6) and audio connections (FIG. 7). The shown lines represent one preferred embodiment in which all connections are two-way (i.e. both send and receive) for two-way communication. Using the multistage server system 100, computer users make session-long audio paths or connections (shown by solid lines) to gateway elements 110. Audio paths or connections (shown by heavy dashed lines) between gateway elements 110 and mixing elements 120 and between pairs of mixing elements 120 are created and removed dynamically as needed to evenly distribute the workload between mixing elements 120 and to ensure that all necessary audio paths or connections defined by computer user free form multi-party conversations exist without constraining the computer users' abilities to apply sound settings to individual audio stream input sources. It should be noted that the physical network paths or connections between gateway elements 110 and mixing elements 120 and between pairs of mixing elements 120 preferably always exist, the actual use of the audio paths or connections (i.e. logical audio paths or connections) are created and removed dynamically (this is discussed in more detail in connection with FIGS. 10 and 11). The control connections (shown by themselves in FIG. 6) facilitate control by the control element 130 to and from the computer users (the connections being shown by dotted or small dashed lines) and the other elements (e.g. gateway elements 110 and mixing elements 120) (the connections being shown by wide lines with diagonal fill).

In order to avoid the need for the computer user equipment to move or to recreate connections over the life of a session, the internet connection formed for passing audio streams between the computer user (in this case, the client computer) and the gateway element 110 lasts the entire conferencing session. This helps prevent gaps or other undesirable effects in the audio stream output produced for all computer users. In order to circumvent the arbitrary limitations of server computational capacity and network bandwidth capacity, audio mixing and gateway functions are preferably off-loaded to whatever degree is necessary to permit any arbitrarily large number of computer users to be supported. Unlike the compression gateways described in relation to the central/off-loaded server system that forwards raw input audio streams to only one mixing element, the gateway elements 110 of the present invention preferably forward the raw input audio streams to any of a plurality of mixing elements 120. Likewise, the gateway elements 110 will receive the mixed audio streams back from any of the mixing elements 120 in order to compress the audio stream output mix and send the audio stream output mix to the computer user. Assignment of computer users to gateway elements 110 can be performed by any algorithm that will spread computer users over the available population of gateway elements 110 (i.e. a gateway spreading function). Exemplary algorithms that can accomplish this gateway spreading function include, but are not limited to the following exemplary spreading functions: every "X" computer user, where "X" is the number of total computer users (e.g. as shown in FIG. 5); groupings of "X" computer users where "X" represents a small number of the anticipated number of computer users (e.g. if X=3, the first three computer users would be assigned to the first gateway element 110, the second three computer users would be assigned to the second gateway element 110, the third three computer users would be assigned to the third gateway element 110, and so on); a distribution in which each gateway element 110 is filled to capacity before assigning computer users to another gateway element 110; and a distribution based on capacity where the capacity of the gateway elements 110 is determined and new computer users are assigned to the gateway element 110 with the most capacity.

Individual computer users are also assigned to a specific mixing element 120 at any given moment. The assignment of a computer user to a mixing element 120 is impermanent and may be changed (mixing control change) at any given moment in order to spread the workload of mixing over the population of available mixing elements 120. Mixing control changes determine which mixing control element 120 handles the mixing function for each computer user, but the mechanics of performing and carrying out the mixing control change is handled (controlled) by the control element 130. The mechanics of performing a mixing control change in which a computer user is changed or transferred from one mixing element 120 to another mixing element 120 is accomplished by coordinating the transferring of the computer user's input audio stream from the gateway element 110 to the assigned mixing element 120 and the forwarding of the audio stream output mix back to the gateway element 110 as a simultaneous change by all elements involved. The gateway element 110 changes to which mixing element 120 the gateway element 110 sends the computer user's input audio stream and from which mixing element 120 the gateway element 110 receives the computer user's output audio stream. Substantially simultaneously, the new mixing element 120 begins to receive the computer user's input audio stream and send the computer user's output audio stream. Also substantially simultaneously, the original mixing element 120 ceases to expect to receive the computer user's input audio stream.

Computer users may be assigned to mixing elements 120 by any algorithm that clusters (groups) computer users who hear one another's audio. An exemplary algorithm may be based on tessellation that groups computer users who are proximate to one another and that can vary the graphic size of each tessell in order to contain approximately the same number of computer users. Even so, the multistage server system 100 preferably does not require that the input mixing element 120 and the output mixing element 120 be the same mixing element 120 regardless of how many computer users the multistage server system 100 supports. Also note that the dynamic reassignment of computer users removes any need for computer users to agree to hold their free form multiparty conversation on any specific server computer.

Figure 12:
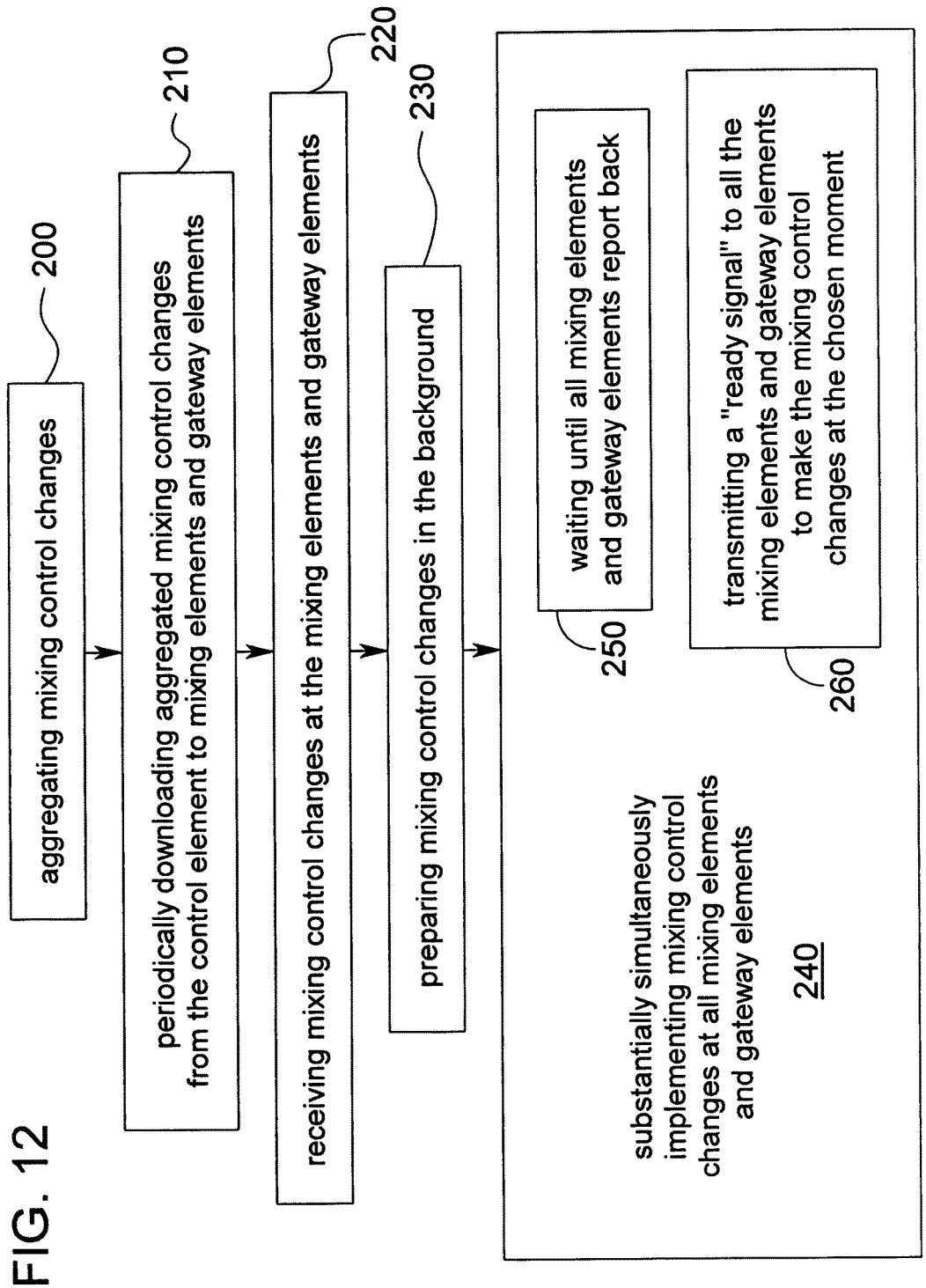
FIG. 12 is a flow chart showing an exemplary preferred method on how mixing control changes are implemented.

FIG. 12 is a flow chart showing an exemplary preferred method on how mixing control changes (computer user to mixing element 120 re-assignments) are implemented. In order to minimize the impact of mixing control changes, mixing control changes are preferably aggregated 200 over a finite period of time and downloaded 210 from the control element 130 to the mixing elements 120 and gateway elements 110 on a periodic basis. The periodic basis may be at set intervals, random, based on a request from an element, based on system load, based on when computer users, change their 3D positions, or otherwise determined. The mixing control changes are received 220 at the mixing elements 120 and the gateway elements 110. Since all computer user audio stream input and output transfer paths must be consistent, mixing control changes are prepared in the background 230 and implemented substantially simultaneously (e.g. as a batch) at all mixing elements 120 and gateway elements 110. This substantially simultaneous implementation 240 is achieved by having the control element 130 wait until all mixing elements 120 and gateway elements 110 report back 250 that they have successfully received and prepared the mixing control changes and can now make the changeover substantially instantaneously. The control element 130 then chooses a moment in time to make the change and transmits 260 the "ready signal" to all the mixing elements 120 and gateway elements 110 to make the change at the chosen moment. Then the process cycles and begins anew. This technique of aggregating mixing control changes (from the control element 130) also rebalances the workload between mixing elements 120 on a timely basis, based on the current state of the computer users.

FIGS. 10 and 11 show an example of mixing control changes. In these figures, the dashed lines between the gateway elements 110 and mixing elements 120 represent the audio streams for respective users (as opposed to representing all the paths by which audio streams may flow). In FIG. 10, gateway element 110a, gateway element 110b, and gateway element 110c are all transmitting a single audio stream to mixing element 120a while mixing element 120b is unused. Two mixing control changes are made between FIG. 10 and FIG. 11. First, in FIG. 11 gateway element 110c is shown as transmitting the audio stream of one of its associated users to mixing element 120b. Second, gateway element 110b is shown as receiving two audio streams (e.g. the audio streams being from different computer users) and transmitting one audio stream to mixing element 120a and one audio stream to mixing element 120b. As can be seen, the distribution in FIG. 11 may be more balanced and, therefore, may be more efficient.

Figure 8:
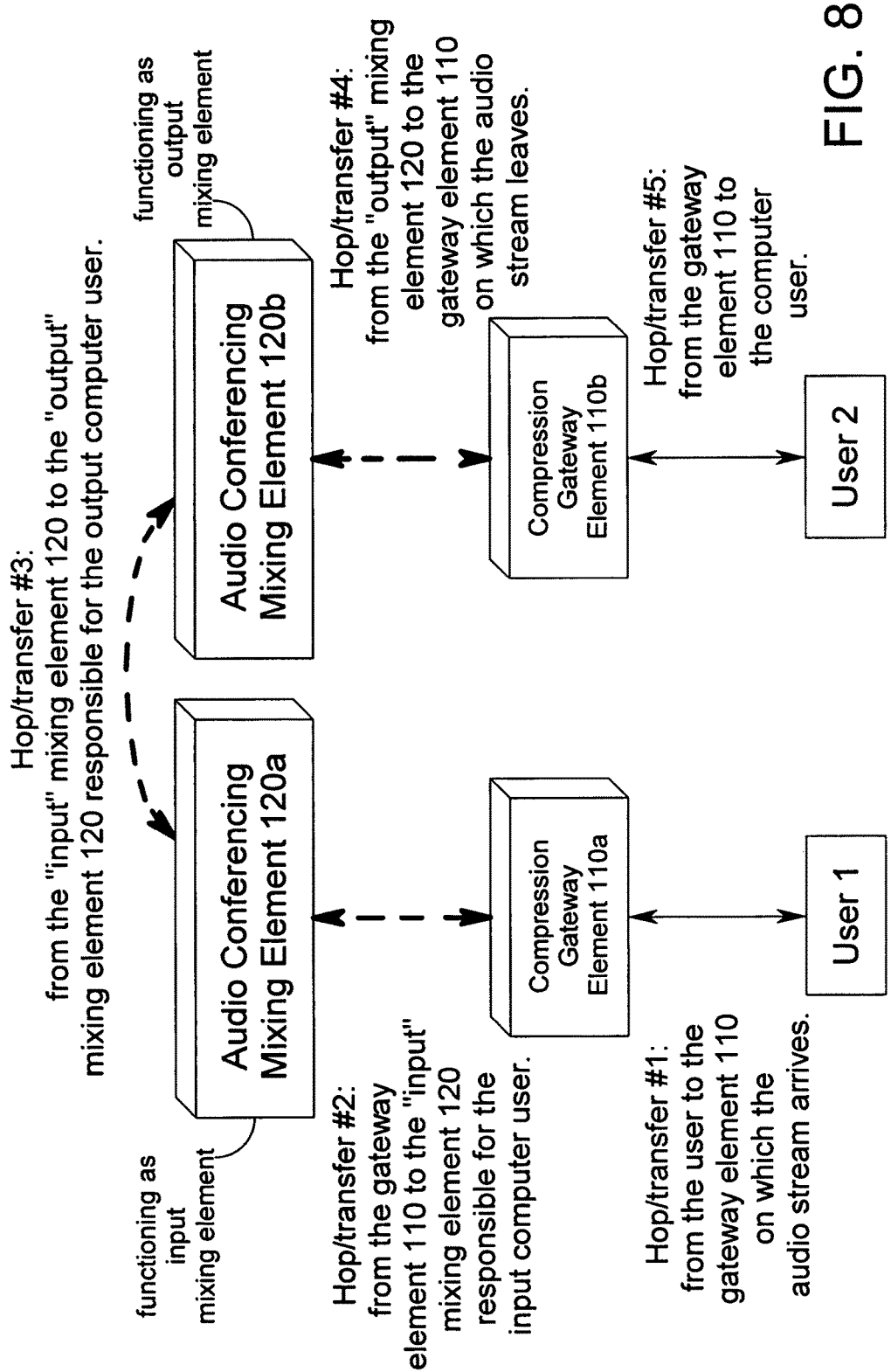
FIG. 8 is a simplified block diagram showing a series of five hops/transfers.

One preferred feature of the present invention is that it facilitates the management of the transmittal of audio streams using hops/transfers from (1) gateway element 110 to (2) mixing element 120 to (3) mixing element 120 to (4) gateway element 110, and (5) to the computer user such that the connections may be redefined as necessary at any moment without impacting the quality of the mixing or causing gaps or other interruptions. This is important since there can be no guarantee that all computer users receiving other computer users' input audio streams mixed into their output audio stream will be collocated on the same mixing element 120. In order to limit the number of hops/transfers that a user's audio stream takes before it is mixed, the mixing element 120 that receives the computer user's input audio stream directly from the gateway element 110 is made responsible for resending the input audio stream to all other mixing elements 120 that will mix that input audio stream into the output audio streams of any computer users assigned to the mixing element 120. Thus, transmission of an audio stream is always limited to five hops/transfers such as those shown in FIG. 8:

Hop/transfer #1: from the source computer user(s) to the gateway element 110 on which the audio stream arrives.

Hop/transfer #2: from the gateway element 110 to the "input" mixing element 120 responsible for the input computer user.

Hop/transfer #3: from the "input" mixing element 120 to the "output" mixing element 120 responsible for the output computer user.

Hop/transfer #4: from the "output" mixing element 120 to the gateway element 110 on which the audio stream leaves.

Hop/transfer #5: from the gateway element 110 to the destination computer user(s).

Figure 9:
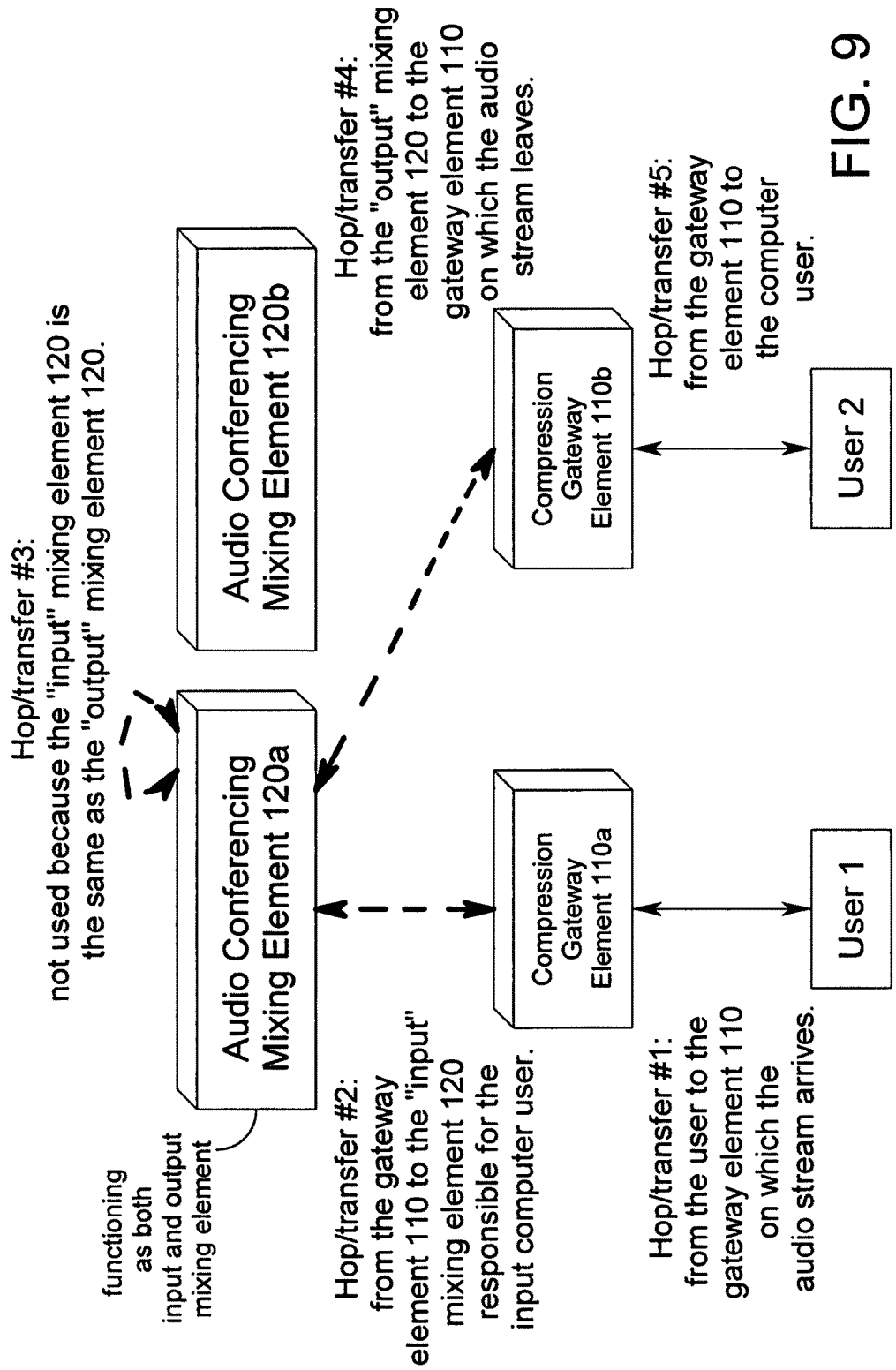
FIG. 9 is a simplified block diagram showing a series of three hops/transfers.

The more frequently the two mixing elements 120 (the input mixing element 120 and the output mixing element 120) described in hops/transfers #2 and #3 in the above sequence are the same mixing element 120, the more efficient the process. This is shown in FIG. 9.

One other concept that the present invention is able to effectively deal with is "leakage." In a "pure" system, computer users will receive audio stream mixes that include audio streams from other computer users whose audio streams have been mixed on the same mixing element 120. However, sometimes computer users want to or need to receive audio stream mixes that include audio streams from other computer users (or other sources), at least one of which whose audio streams has not been assigned to the same mixing element 120 as the other computer users. In such a case, the mixing element 120 that receives the odd computer user's input audio stream directly from the gateway element 110 is made responsible for resending the input audio stream to all other mixing elements 120 that will mix that input audio stream into the output audio streams of any computer users assigned to the mixing element 120. An exemplary way by which this can be accomplished using the system 100 is to have the mixing element 120 and/or control element 130 be aware of and/or provide information pertaining to possible adjacent mixing elements 120 to which the mixing element at issue should forward audio streams. This may be accomplished using "lists" and/or direct connections implemented in software and/or hardware.

Using the control element 130 as set forth above may result in several advantages. First, it minimizes the impact of the control function on the mixing function by off-loading control processing onto the control element 130. Second, it minimizes the impact of the control function on the mixing function by causing the control element 130 to aggregate sets of changes to the mixing definitions into batches. Third, it minimizes the impact of the control function on the mixing function by preparing control definition changes in the mixing elements 120 and gateway elements 110 as a background task until complete. Fourth, it minimizes the impact of the control function on the mixing function by synchronizing changeover at the different mixing elements 120 and gateway elements 110 using the control element 130 to coordinate changeover.

Exemplary Implementation of the Present Invention

As set forth above, the ability for computer users to identify individual speakers and to adjust sound settings applied to other computer users is critical to the simulation of geographical position utilizing 3D sound effects. Accordingly, preferred embodiments of the multistage server system 100 of the present invention are ideal for this purpose.

In this embodiment of the present invention, 3D space (or virtual world) can be thought of (or literally implemented) as "tessalled" or "tiled." Tessellation or tiling is a collection of plane figures (e.g. regular or irregular shapes) that fills the plane with no overlaps and no gaps. Generalizations to higher dimensions are also possible. FIGS. 13 and 14 show a 2D version of a tesselled or tiled virtual world in which each tessell is a hexagon (although the tessells could be any shape or a variety of shapes), and in which each tessell is the same size (although the tessells could be different sizes). In FIG. 13, User 1, User 2, and User 3 are "standing" in a single tessell 320*a*. When User 1 entered the virtual world, his audio stream was assigned to gateway element 110*a* (see FIG. 5). When User 2 entered the virtual world, his audio stream was assigned to gateway element 110*b* (see FIG. 5). When User 3 entered the virtual world, his audio stream was assigned to gateway element 110*c* (see FIG. 5). The assigned gateway elements 110 do not change. However, for purposes of this invention, each tessell 320 is mixed by a specific mixing element 120. For example, the audio in tessell 320*a* is mixed by a mixing element 120*a* and the audio in tessell 320*b* is mixed by a mixing element 120*b*. Accordingly, since User 1, User 2, and User 3 are in tessell 320*a*, their audio streams are being mixed by mixing element 120*a*. Since there are no users in tessell 320*b*, mixing element 120*b* is not being used. This corresponds to the scenario in FIG. 10. At this point, however, two mixing control changes occur: first, User 3 enters tessell 320*b* and second, User 11 enters tessell 320*b*. The resulting configuration is shown in FIG. 14. This configuration also corresponds to the scenario in FIG. 11. Specifically, User 1's audio stream (provided through gateway element 110*a*) and User 2's audio stream (provided through gateway element 110*b*) continue to be mixed by mixing element 120*a* because they are standing in tessell 320*a*. User 3's audio stream (provided through gateway element 110*c*) and User 11's audio stream (provided through gateway element 110*b* (see FIG. 5)) are now being mixed by mixing element 120*b* because they are standing in tessell 320*b*. Tessells 320 can be static in size or they may be variable so that they can consistently load the mixing elements 120, although users would be unaware of the implementation.

Using the example of 3D space, the concept of "leakage" can be demonstrated. As shown in FIGS. 13 and 14, User 15, although "standing" in tessell 320*c*, is very near both tessell 320*a* and tessell 320*b*. Accordingly, the computer users in tessell 320*a* and tessell 320*b* might be able to hear User 15's audio streams. User 15 would connect to gateway element 110*c* (see FIG. 5) and his audio stream would be transferred to mixing element 120*c* because he is in tessell 320*c*. Mixing element 120*c*, however, is made responsible for resending the User 15's audio stream to at least the relevant mixing elements 120 (e.g. mixing elements 120*a* and 120*b*). In this way, mixing elements 120*a* and 120*b* will be able to add User 15's audio stream to mix (possibly at a lower volume) with audio streams from users standing in their respective tessells.

Alternative Preferred Embodiments

Although the preferred embodiments of the present invention discussed above have been described in terms of a single control element 130, it should be noted that alternative preferred embodiments could include multiple control elements. These may be chained together, have a master-slave relationship, have individual specializations that work together, have a full or partial redundant relationship (e.g. analogous to RAID disk drives), and/or be otherwise connected. One advantage of using multiple control elements is that it would remove any remaining limit to scalability of the present invention in that, when system resources become scarce, an additional control element could be added. Another advantage of using multiple control elements is that they could eliminate any single point failure.

Although the preferred embodiments of the present invention discussed above have been described in terms of the internet connection formed for passing audio streams between the computer user and the gateway element 110 lasting the entire conferencing session, an alternative preferred embodiment would allow users to be dynamically reassigned to different gateway elements. Such an embodiment would be useful in very large multistage server systems 100 because an optimal "gateway element to mixing element connection" could be created. One type of optimization would be to associate computer users with gateway elements 110 that are physically closer to a particular mixing element 120. This would be a "real-world" networking consideration that would save bandwidth on a network (e.g. a LAN) on which the multistage server systems 100 were being implemented. This geographical optimization could be implemented as clusters (including mixing elements 120 and gateway elements 110) that are strategically positioned (e.g. in major cities).

Although the preferred embodiments of the present invention discussed above have been described in terms of the gateway elements 110 being in two-way communication with all of the mixing elements 120, in an alternative preferred embodiment the gateway elements 110 are in two-way communication with only a subset of the mixing elements 120. Similarly, although the preferred embodiments of the present invention discussed above have been described in terms of each mixing element 120 being in two-way communication with all of the remaining mixing elements 120, in an alternative preferred embodiment each mixing elements 120 is in two-way communication with only a subset of the remaining mixing elements 120.

TERMINOLOGY

It should be noted that the term "element" (e.g. in gateway elements 110, mixing elements 120, and a control element 130) is meant to include technologies including, but not limited to servers, computers, or other processing elements having sufficient capacity to perform the functions associated therewith. In an exemplary embodiment, the gateway elements 110 may be implemented using any server having processing and memory capacity and/or digital signal processing capability. In an exemplary embodiment, the mixing elements 120 may be implemented using any server having processing and memory capacity and/or digital signal processing capability. In an exemplary embodiment, the control element 130 may be implemented using any server having processing and memory capacity.

The descriptions and applications herein are not to be construed as limiting the invention, but as examples and illustrations of the invention. For example, it should be noted that the present invention may be implemented using different types of technology including but not limited to computers, workstations, handheld technical devices (e.g. Pocket PC® devices, Palm® devices), telephones including or connected to a digital interface, interactive televisions, kiosks, dedicated devices, or virtually any current or future interactive technologies (generally referred to throughout this specification as "computers").

Source Code

AppendixA.txt is a source code for an exemplary program as described above, which contains the following software components: tesselation.c, control_transmit_assignments_CGWs.c, CGWs_receive_assignments_control.c, CGWs_exchange_audio_with_mixers.c, Mixers_exchange_audio_with_CGWs.c, Mixers_send_audio_to_mixers.c, Mixers_receive_audio_from_Mixers.c, control_transmit_assignments_mixers.c, Mixers_receive_assignments_control.c. These software components are included on the two identical CDs that are submitted with this application, and this material on the CDs is incorporated into this specification by reference.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. An audio conferencing server that facilitates free form multi-party conversations between users, said audio conferencing server comprising:
a plurality of gateway elements, each gateway element in two-way communication with at least one of a plurality of user computers;
a plurality of mixing elements, each gateway element in two-way communication with at least one of the mixing elements over a persistent control connection and a dynamic audio connection and each mixing element in two-way communication with at least one other mixing element over a persistent control connection and a dynamic audio connection;
a control element in two-way communication with each of the plurality of gateway elements, each of the plurality of mixing elements, and each of the plurality of user computers over persistent control connections, the control element dynamically creating and removing the logical connections to distribute a workload among said plurality of mixing elements by dynamically creating and removing dynamic audio connections between the mixing elements and between the mixing elements and the gateway elements while maintaining the persistent control connections;
at least one source computer from the plurality of user computers, the source computer providing a source audio stream to one of said plurality of gateway elements,
one of said plurality of mixing elements receiving said source audio stream from said one of said plurality of gateway elements; and
one of said plurality of mixing elements performing a mixing function on said source audio stream to form an audio stream mix comprising a plurality of output audio streams using said at least one source audio stream; and
at least one destination computer from the plurality of user computer, the destination computer receiving said audio stream mix from said one of said plurality of mixing elements performing a mixing function on said source audio stream;
wherein the mixing function performed by the one of the plurality of mixing elements comprises adjusting sound settings for at least one of the output audio streams independent of the other output audio streams based on a mix list or three-dimensional position received from the destination computer.

2. The audio conferencing server of claim 1, wherein said audio conferencing server facilitates free form multi-party conversations between users of the plurality of user computers in a three-dimensional virtual world.

3. The audio conferencing server of claim 1, wherein said persistent control connections are distinct from the dynamic audio connections between said gateway elements and said mixing elements and between said mixing elements.

4. The audio conferencing server of claim 1, wherein said two-way communication between said user computers and said gateway elements are persistent, session-long audio connections.

5. The audio conferencing server of claim 1, wherein said dynamic audio connections between said gateway elements and said mixing elements are over logical connections that are created and removed dynamically.

6. The audio conferencing server of claim 1, wherein said at least one source computer comprises a plurality of source computers, each source computer providing a source audio stream to one of said plurality of gateway elements based on a gateway spreading function.

7. The audio conferencing server of claim 1, wherein said at least one source computer comprises a plurality of source computers, each source computer providing a source audio stream via a respective gateway element to one of said plurality of mixing elements.

8. The audio conferencing server of claim 1, wherein said at least one source computer comprises a plurality of source computers, each source computer providing a source audio stream via a respective gateway element to one of said plurality of mixing elements based on a position of a user of the source computer in a three-dimensional virtual world.

9. The audio conferencing server of claim 1, wherein each of said plurality of mixing elements provides said audio stream mix to the destination computer based on a position of a user of the destination computer in association with said mixing element in a three-dimensional virtual world.

10. The audio conferencing server of claim 1, wherein said one of said plurality of mixing elements receiving said source audio stream resends said source audio stream to said one of said plurality of mixing elements performing a mixing function.

11. The audio conferencing server of claim 1, wherein said control element is a plurality of control elements.

12. The audio conferencing server of claim 1, wherein said two-way communication between said user computers and said gateway elements are dynamically created and removed audio connections.

13. A method of facilitating free-form, multi-part conversations between users in an audio conference, the method comprising:
    establishing, by an audio conferencing server, a two-way communication between each of a plurality of user computers and at least one of a plurality of gateway elements;
    establishing, by the audio conferencing server, two-way communication between each gateway element and at least one of a plurality of mixing elements over a persistent control connection and a dynamic audio connection;
    establishing, by the audio conferencing server, a two-way communication between each mixing element and at least one other mixing element over a persistent control connection and a dynamic audio connection;
    establishing, by the audio conferencing server, a two-way communication between a control element and each of the plurality of gateway elements, each of the plurality of mixing elements, and each of the plurality of user computers over persistent control connections;
    distributing, by the audio conferencing server through the control element, a workload among said plurality of mixing elements by dynamically creating and removing dynamic audio connections between the mixing elements and between the mixing elements and the gateway elements while maintaining the persistent control connections;
    receiving, by the audio conferencing server from at least one source computer of the plurality of user computers, a source audio stream to one of said plurality of gateway elements, wherein one of said plurality of mixing elements receives said source audio stream from said one of said plurality of gateway elements and one of said plurality of mixing elements performs a mixing function on said source audio stream to form an audio stream mix comprising a plurality of output audio streams using said at least one source audio stream; and
    providing, by the audio conferencing server to at least one destination computer of the plurality of user computers, said audio stream mix from said one of said plurality of mixing elements performing a mixing function on said source audio stream, wherein the mixing function performed by the one of the plurality of mixing elements comprises adjusting sound settings for at least one of the output audio streams independent of the other output audio streams based on a mix list or three-dimensional position received from the destination computer.

14. The method of claim 13, wherein said at least one source computer comprises a plurality of source computers, each source computer providing a source audio stream to one of said plurality of gateway elements based on a gateway spreading function.

15. The method of claim 13, wherein said at least one source computer comprises a plurality of source computers, each source computer providing a source audio stream via a respective gateway element to one of said plurality of mixing elements.

16. The method of claim 13, wherein said at least one source computer comprises a plurality of source computers, each source computer providing a source audio stream via a respective gateway element to one of said plurality of mixing elements based on a position of a user of the source computer in a three-dimensional virtual world.

17. The method of claim 13, wherein each of said plurality of mixing elements provides said audio stream mix to the destination computer based on a position of a user of the destination computer in association with said mixing element in a three-dimensional virtual world.

18. A computer readable memory comprising a set of instructions stored thereon which, when executed by a processor, causes the processor to facilitate free-form, multi-part conversations between users in an audio conference by:
    establishing a two-way communication between each of a plurality of user computers and at least one of a plurality of gateway elements;
    establishing two-way communication between each gateway element and at least one of a plurality of mixing elements over a persistent control connection and a dynamic audio connection;
    establishing a two-way communication between each mixing element and at least one other mixing element over a persistent control connection and a dynamic audio connection;
    establishing a two-way communication between a control element and each of the plurality of gateway elements, each of the plurality of mixing elements, and each of the plurality of user computers over persistent control connections;
    distributing, through the control element, a workload among said plurality of mixing elements by dynamically creating and removing dynamic audio connections between the mixing elements and between the mixing elements and the gateway elements while maintaining the persistent control connections;
    receiving, from at least one source computer of the plurality of user computers, a source audio stream to one of said plurality of gateway elements, wherein one of said plurality of mixing elements receives said source audio stream from said one of said plurality of gateway elements and one of said plurality of mixing elements performs a mixing function on said source audio stream to form an audio stream mix comprising a plurality of output audio streams using said at least one source audio stream; and providing, to at least one destination computer of the plurality of user computers, said audio stream mix from said one of said plurality of mixing elements performing a mixing function on said source audio stream, wherein the mixing function performed by the one of the plurality of mixing elements comprises adjusting sound settings for at least one of the output audio streams independent of the other output audio streams based on a mix list or three-dimensional position received from the destination computer.

* * * * *